United States Patent [19]

Shipitalo

[11] 4,100,986
[45] Jul. 18, 1978

[54] SPLIT PILLOW BLOCK FOR MOUNTING A DIFFERENTIAL

[75] Inventor: William M. Shipitalo, Novelty, Ohio

[73] Assignee: Towmotor Corporation, Mentor, Ohio

[21] Appl. No.: 799,068

[22] Filed: May 20, 1977

[51] Int. Cl.² .................................................. B60K 17/16
[52] U.S. Cl. .......................................... 180/75; 180/88; 214/672
[58] Field of Search .............................. 214/672–674; 180/54, 73, 75, 70 R, 88; 301/124 H; 74/607; 187/9 R

[56] References Cited

U.S. PATENT DOCUMENTS

| 1,702,516 | 2/1929 | Mogford | 180/75 |
| 1,720,064 | 7/1929 | Smith | 180/73 |
| 2,216,697 | 10/1940 | Vossenberg | 214/672 |
| 2,299,445 | 10/1942 | Weaver | 180/54 X |
| 2,348,801 | 5/1944 | French | 180/75 |
| 2,471,429 | 5/1949 | Hawkins | 180/54 |
| 2,802,542 | 8/1957 | Gerst | 180/75 |
| 2,806,543 | 9/1957 | Nallinger | 180/73 D |
| 3,207,249 | 9/1965 | Singer | 180/54 |
| 3,434,364 | 3/1969 | Keese | 180/75 X |
| 3,662,849 | 5/1972 | Bostad | 180/54 E |

FOREIGN PATENT DOCUMENTS

| 826,975 | 11/1969 | Canada | 214/672 |
| 1,369,381 | 7/1964 | France | 180/54 E |

Primary Examiner—Joseph F. Peters, Jr.
Assistant Examiner—Terrance L. Siemens
Attorney, Agent, or Firm—Wegner, Stellman, McCord, Wiles & Wood

[57] ABSTRACT

An improved differential mounting for a vehicle including a vehicle frame, an elongated, hollow, wheel spindle mounted on the frame, a wheel rotatably mounted on one end of the spindle, a differential gear assembly having a housing with a tubular protrusion terminating in an opening aligned with the other end of the spindle, a drive shaft within the spindle and removably connected to the wheel and to the differential gear assembly, and a split pillow block interconnecting the spindle and the housing and including a tubular collar disposed about the ends of the spindle adjacent the housing and the protrusion and having an integral partial collar disposed partially about the protrusion, and a separate partial collar mating with the integral partial collar and removably secured thereto about the protrusion.

11 Claims, 3 Drawing Figures

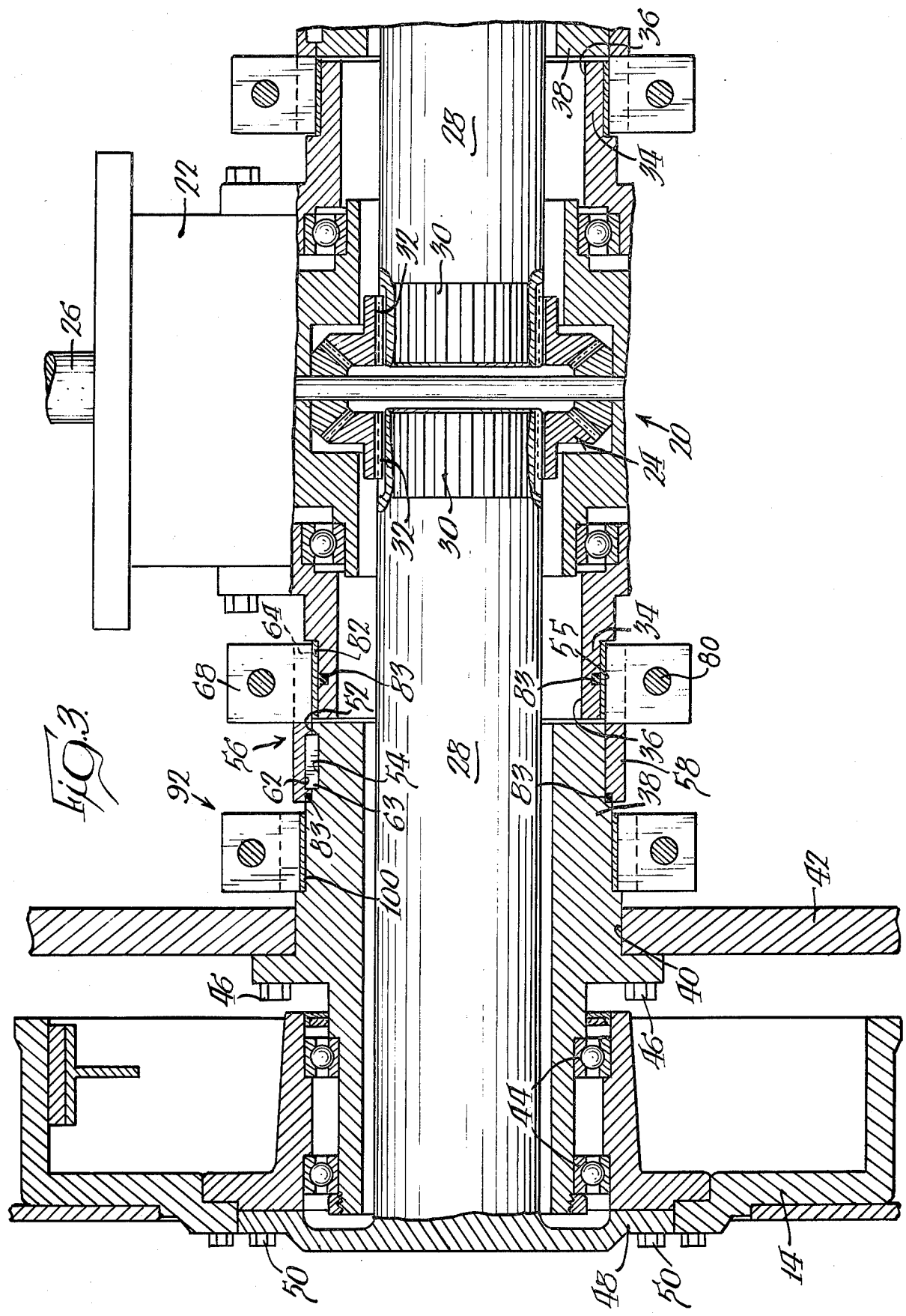

SPLIT PILLOW BLOCK FOR MOUNTING A DIFFERENTIAL su

BACKGROUND OF THE INVENTION

This invention relates to the mounting of differential gear assemblies in vehicles.

The installation of differentials in vehicles having drive wheel spindles separate from the differential frequently poses a problem in that some means are required to support the differential housing in alignment with the wheel spindles while they are being assembled. While at the point of assembly, such means are provided with regularity, the problem is accentuated where the differential must be disassembled from the vehicle for servicing, or the like, and subsequently reassembled thereto. Quite frequently, such is accomplished in smaller servicing shops wherein specialized equipment is not readily available, with the consequence that considerable labor and effort is expended in achieving the alignment required.

Moreover, in many such assemblages, when disassembly of the differential from the vehicle is required, considerable disassembly of adjacent components may be required, thereby rendering servicing time-consuming and expensive.

SUMMARY OF THE INVENTION

The present invention is directed to overcoming one or more of the problems as set forth above.

According to the present invention, there is provided in a vehicle structure, the combination of a vehicle frame, an elongated, hollow wheel spindle mounted on the frame, a wheel rotatably mounted on one end of the spindle, a differential gear assembly having a housing with a tubular protrusion terminating in an opening aligned with the other end of the spindle, and a split pillow block interconnecting the spindle other end and the housing. The split pillow block includes a tubular collar disposed about one or the other of the spindle and the protrusion and an integral, partial collar disposed partially about the other of the spindle and the protrusion. There is further provided a separate partial collar mating with the integral partial collar and removably secured thereto.

Other objects and advantages will become apparent from the following specification taken in connection with the accompanying drawings.

DESCRIPTION OF THE DRAWINGS

FIG. 3 is an enlarged, fragmentary, sectional view of the assembly of a differential to a wheel spindle according to the invention.

DESCRIPTION OF THE PREFERRED EMBODIMENT

Figure 1:
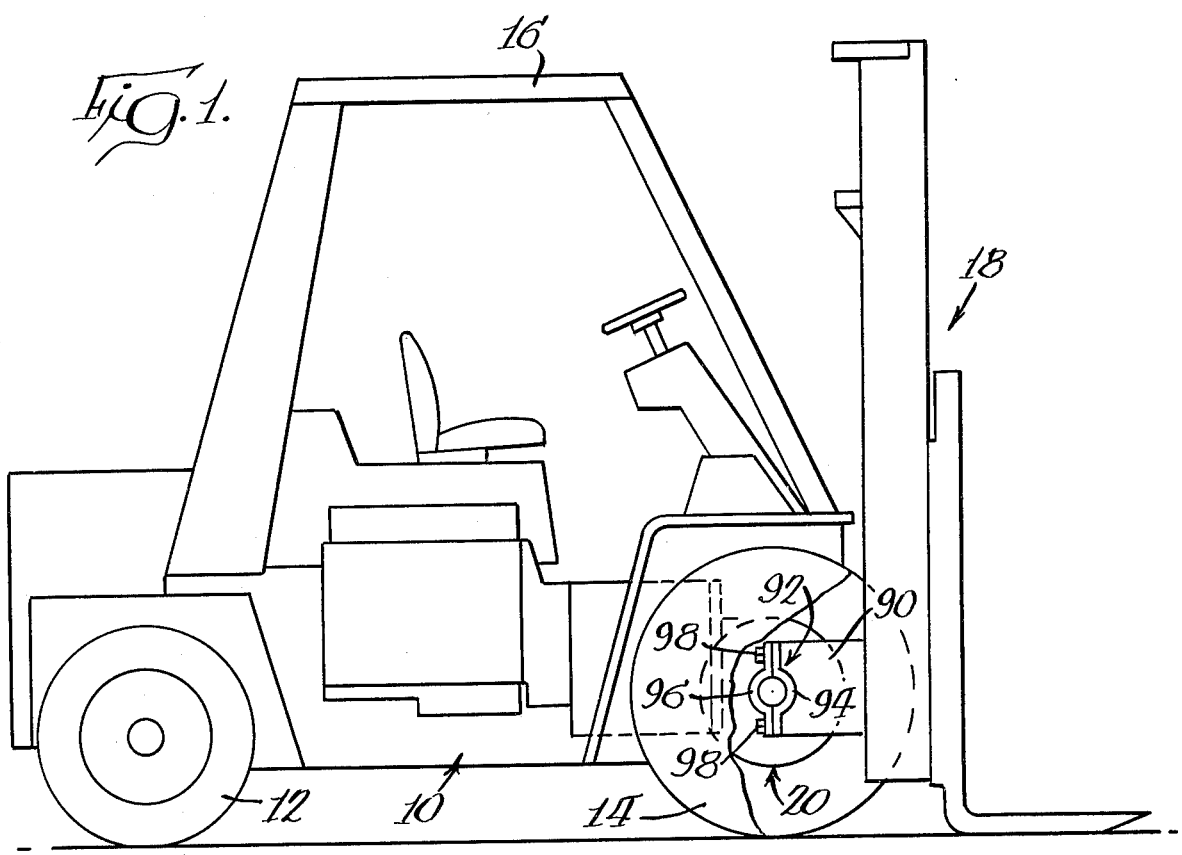
FIG. 1 is a side elevation of a vehicle, specifically, a lift truck, embodying the invention with parts broken away for clarity.

An exemplary embodiment of the invention is illustrated in FIG. 1 in connection with a lift truck having a frame, generally designated 10, mounting rear wheels 12 and powered front wheels 14. The frame also mounts an operator cab 16, a suitable propulsion source (not shown) and the usual mast and fork, generally designated 18.

As mentioned, the front wheels 14 of the lift truck are the driven wheels and there is included as part of the drive train, a differential gear assembly, generally designated 20.

Turning to FIG. 3, the differential gear assembly 20 is seen to include a housing 22 encompassing a differential gear, generally designated 24, of conventional construction and forming no part of the invention.

The propulsion source of the vehicle provides a rotary input to the differential 20 through a rotary shaft 26 and the output is applied to drive shafts 28 connected to the wheels 14. As can be seen in FIG. 3, the innermost ends of the drive shafts 28 are splined as at 30 so as to be slidably received in splined bores 32 of certain of the gears of the differential.

The housing 22 includes oppositely directed tubular protrusions 34 having openings 36 through which the drive shafts 28 emerge. Preferably, although not necessarily, the external configuration of the end of the protrusions 34 will be that of a cylinder.

Tubular wheel spindles are aligned with the protrusions 34 and extend through apertures 40 in portions 42 of the frame 10 on opposite sides of the vehicle and at their ends opposite from the differential 20 mount bearings 44 which journal the wheels 14. The spindles 38 are secured to the frame 42 by bolts 46. At the wheel end of each spindle 38, the corresponding drive shaft 28 includes an annular, radially outwardly extending flange 48 which receives bolts 50 by which the flange 48 is secured to the corresponding one of the wheels 14 to establish a driving relation therebetween. It will be observed that by removal of the bolts 50, each of the drive shafts 28 is removable from the differential 20 and the associated wheel spindle 38 through the end of the spindle 38 remote from the differential 20.

The end of each spindle 38 adjacent the differential housing 22 is, as mentioned previously, aligned with the corresponding protrusion 34 and includes a reduced diameter portion 52 which is cylindrical in configuration and which includes at least one keyway 54. A split pillow block, generally designated 56, removably interconnects the reduced diameter portion 52 of each spindle 38 and a similar reduced diameter portion 55 on the end of each protrusion 34.

Figure 2:
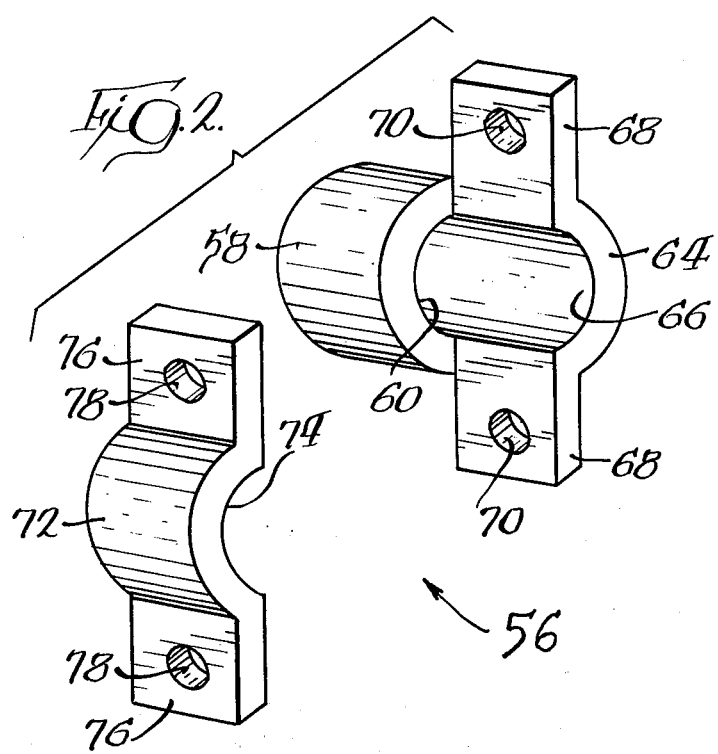
FIG. 2 is an exploded view of a split pillow block embodied in the invention.

Referring to FIG. 2, the details of the split pillow block 56 are illustrated in detail. Each includes a tubular collar 58 having a cylindrical hollow interior 60 and of one-piece construction. The collar 58 is adapted to be disposed about the reduced diameter portion 52 of one of the wheel spindles 38 and keyed thereto by means of a keyway 62 formed therein and a key 63 (FIG. 3).

Integral with the tubular collar 58 is a partial collar 64, also having a cylindrical interior surface 66 and opposed, radially outwardly extending flanges 68. The flanges 68 are provided with threaded bores 70 for receipt of threaded fasteners, as will be seen. A separate partial collar 72 is provided and the same also has a semi-cylindrical interior surface 74 and radially outwardly extending flanges 76 provided with bores 78 therein. The integral partial collar 64 is adapted to partially surround reduced diameter portion 55 of the protrusion 34 and, when disposed in such a location, the separate partial collar 72 will mate therewith about the remainder of the protrusion 34. Upon the application of bolts 80 through the bores 78 to be threadably received in the threaded bore 70, which are aligned with the bores 78, the assemblage may be permanently clamped in place. Preferably, a resilient bushing 82 is interposed between the partial collar and the reduced diameter portion 56 of the projection 34 and seals 83 are employed where indicated.

Preferably, the location of the keyways 54 and 62 is such that the integral partial collar 64 will underlie the protrusion 34. That is, the semi-cylindrical surface 66 in the integral partial collar should be upwardly open. In this way, even when the separate partial collar 72 is removed from the assemblage, which will normally be the case prior to complete assembly or when the differential is to be removed for servicing, the integral partial collars 64 on the two wheel spindles will provide a support for the differential housing 22. Moreover, the unique arrangement of the reduced diameter portion 52, which receives the tubular collar 58 provides a piloting action so that alignment is readily facilitated. Consequently, assembly at the factory, or reassembly after servicing, is greatly facilitated without the need for special fixtures or the like to maintain the spindles in alignment with the differential 22.

It will also be appreciated that the differential 22 may be easily removed from the vehicle for servicing with a minimum of effort. It is only necessary to remove the bolts 50 and extract the drive shafts 28 sufficiently such that the splined ends 30 clear the ends of the protrusions 34 and remove the bolts 80 and partial collar 72. At that time, the differential can be readily extracted from the vehicle while the wheels 14 remain on the vehicle.

In this connection, it will also be observed that the drive shafts 28 may be removed from the vehicle simply by removing the bolts 50 without removing the wheels 14 from the vehicle.

It will also be observed that the resilient bushing 82 provides significant advantages. The bushing 82 allows a certain amount of relative rotational motion between the differential housing 22 and the spindles 38 in response to differing dynamic conditions occurring during operation of the vehicle due to acceleration or the like and, when formed of resilient material, accomplishes not only the foregoing function but provides vibration isolation as well.

In a large measure, the foregoing advantages are due to the fact that the wheel spindles 38 are affixed directly to the frame allowing the aforementioned removal of the differential and without removing the wheels 14 from the wheel spindles 38 and thus the frame.

Still another advantage may accrue from such a construction. With reference to FIGS. 1 and 3, the mast 18 includes spaced, rearwardly extending mounting brackets 90 (only one of which is shown) which are alignable with the wheel spindles 38 on the side of the split pillow blocks 64 remote from the longitudinal axis of the vehicle. As seen in FIG. 1, each of the mounting brackets 90 mounts, at its rear extremity, a vertically oriented pillow block bearing, generally designated 92, one half 94, of which is secured to the bracket 90 and the other half, 96, of which is secured to the half 94 as by bolts 98. With reference to FIG. 3, the pillow blocks 92 are shown rotated 90° from their actual position when installed to simplify viewing purposes and a bushing 100 is interposed between the pillow block halves 94 and 96 and the wheel spindle 38 to rotatably mount the mast 18 for fore and aft tipping movement.

Because the wheel spindles 38 are affixed to the vehicle frame, they constitute the sole support for the mast 18 and any load carried thereby so that drive components, including the differential 20, are not subjected to bending stresses due to loading on the mast 18.

While the invention has been described in connection with the drive train for a lift truck, those skilled in the art will readily appreciate its applicability to other vehicles having separate differential housings and wheel spindles for drive wheels; and that no limitation to lift trucks is intended.

The embodiments of the invention in which an exclusive property or privilege is claimed are defined as follows:

1. In a vehicle, the combination of:
a vehicle frame;
an elongated, hollow wheel spindle mounted on said frame;
a wheel rotatably mounted on one end of said spindle;
a differential gear assembly having a housing with a tubular protrusion terminating in an opening aligned with the other end of said spindle;
a drive shaft within said spindle and removably connected to said wheel and to said differential gear assembly; and
a split pillow block interconnecting said spindle other end and said housing and including a tubular collar disposed about one of said spindle other end and said protrusion, an integral partial collar disposed partially about the other of said spindle other end and said protrusion, and a separate partial collar mating with said integral partial collar and removably secured thereto about said other of said spindle other end and said protrusion.

2. The vehicle of claim 1 wherein said tubular collar is disposed about said spindle other end such that said integral partial collar is upwardly opening to provide a support for said protrusion, and thus said housing, when said separate partial collar is removed from the vehicle.

3. The vehicle of claim 1 wherein said drive shaft is removable from said spindle from said spindle one end.

4. The vehicle of claim 1 further including a bushing disposed on said protrusion and interposed between said protrusion and said split pillow block.

5. The vehicle of claim 4 wherein said bushing is resilient.

6. The vehicle of claim 1 wherein said tubular collar is a one-piece collar.

7. The vehicle of claim 1 wherein said spindle other end terminates in a cylindrical, reduced diameter section serving as a pilot for said tubular collar.

8. The vehicle of claim 1 wherein said tubular collar is disposed about said spindle other end such that said integral partial collar is upwardly opening to provide a support for said protrusion, and thus said housing, when said separate partial collar is removed from the vehicle and wherein said tubular collar is keyed to said spindle other end.

9. In a vehicle, the combination of:
a vehicle frame;
an elongated, hollow wheel spindle mounted on said frame;
a wheel rotatably mounted on one end of said spindle;
a differential gear assembly having a housing with a tubular protrusion terminating in an opening aligned with the other end of said spindle, said spindle other end and said protrusion being generally cylindrical; and
a split pillow block interconnecting said spindle other end and said housing and including a hollow cylindrical collar disposed about said spindle other end and having an integral, semi-cylindrical, partial collar disposed partially about said protrusion in weight supporting relation thereto, said integral partial collar having radially outwardly directed flanges, and a separate cylindrical partial collar having radially outwardly extending flanges mating with said integral partial collar, and bolts extending between the flanges of said partial collars to clampingly secure said split pillow block to said protrusion.

10. In a vehicle, the combination of:

a vehicle frame;

an elongated, hollow wheel spindle mounted on said frame;

a wheel journalled on one end of said spindle;

a differential gear assembly having a housing with a tubular protrusion terminating in an opening aligned with the other end of said spindle;

a drive shaft within said spindle and entering said differential gear assembly housing through said tubular protrusion and removably connected to said differential gear assembly; and removable means affixing said drive shaft to said wheel;

whereby upon removal of said removable means, said drive shaft may be removed from said wheel spindle without removing said wheel from said wheel spindle.

11. In a vehicle, the combination of:

a vehicle frame having opposed sides;

aligned, hollow wheel spindles mounted on said sides;

wheels rotatably mounted on one end of each of said spindles;

a differential gear assembly between said sides and having a housing with opposed tubular protrusions terminating in openings aligned with the ends of said spindles remote from said wheels;

means removably connecting said differential gear assembly housing to said wheel spindles to be supported thereby;

drive shafts within said spindles and removably connected to corresponding ones of said wheels and to said differential gear assembly;

a mast including loading means; and means journalling said mast on said wheel spindles;

whereby drive components are not subjected to forces generated by loads placed on said mast.

* * * * *